US008271728B2

(12) United States Patent
Strumper et al.

(10) Patent No.: US 8,271,728 B2
(45) Date of Patent: Sep. 18, 2012

(54) SPIRAL CACHE POWER MANAGEMENT, ADAPTIVE SIZING AND INTERFACE OPERATIONS

(75) Inventors: Volker Strumper, Austin, TX (US); Matteo Frigo, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/270,249

(22) Filed: Nov. 13, 2008

(65) Prior Publication Data

US 2010/0122031 A1  May 13, 2010

(51) Int. Cl.
*G06F 12/00* (2006.01)
(52) U.S. Cl. .......................... 711/118; 711/122; 711/119
(58) Field of Classification Search .................. None
See application file for complete search history.

(56) References Cited

U.S. PATENT DOCUMENTS

| | | | |
|---|---|---|---|
| 5,355,345 | A | 10/1994 | Dickinson et al. |
| 6,996,117 | B2 * | 2/2006 | Lee et al. .................. 370/429 |
| 7,107,399 | B2 | 9/2006 | Bilardi et al. |
| 2002/0116579 | A1 | 8/2002 | Goodhue et al. |
| 2003/0145239 | A1 * | 7/2003 | Kever et al. ............... 713/300 |
| 2003/0236961 | A1 * | 12/2003 | Qiu et al. .................. 711/170 |
| 2005/0114618 | A1 | 5/2005 | Lu et al. |
| 2005/0132140 | A1 | 6/2005 | Burger et al. |
| 2006/0212654 | A1 | 9/2006 | Balakrishnan |

OTHER PUBLICATIONS

Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", 10th International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.
Dickinson et al., "A Systolic Architecture for High Speed Pipelined Memories", IEEE, 1993, p. 406-409.

(Continued)

*Primary Examiner* — Kevin Ellis
*Assistant Examiner* — Stella Eun
(74) *Attorney, Agent, or Firm* — Mitch Harris, Atty at Law, LLC; Andrew M. Harris; Libby Z. Toub

(57) ABSTRACT

A spiral cache memory provides low access latency for frequently-accessed values by self-organizing to always move a requested value to a front-most storage tile of the spiral. If the spiral cache needs to eject a value to make space for a value moved to the front-most tile, space is made by ejecting a value from the cache to a backing store. A buffer along with flow control logic is used to prevent overflow of writes of ejected values to the generally slow backing store. The tiles in the spiral cache may be single storage locations or be organized as some form of cache memory such as direct-mapped or set-associative caches. Power consumption of the spiral cache can be reduced by dividing the cache into an active and inactive partition, which can be adjusted on a per-tile basis. Tile-generated or global power-down decisions can set the size of the partitions.

16 Claims, 11 Drawing Sheets

OTHER PUBLICATIONS

Beckmann et al., "Managing Wire Delay in Large Chip-Multiprocessor Caches", 37th Annual IEEE/ACM International Symposium on Microarchitecture, Dec. 2004, p. 319-330, Portland, OR.

Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.

Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

Foglia et al, "A NUCA Model for Embedded Systems Cache Design", 3rd IEEE Workshop on Embedded Systems for Real-Time Multimedia, Sep. 2005, p. 41-46, New York, NY.

Huh et al., "A NUCA Substrate for Flexible CMP Cache Sharing", International Conference on Supercomputing, Jun. 2005, p. 31-40, Boston, MA.

Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.

U.S. Appl. No. 12/264,682, filed Nov. 4, 2008, Li et al.

Abella et al., "Power Efficient Data Cache Designs", IEEE Computer Society, Oct. 2003, p. 3-8, San Jose, CA.

Gilbert et al., "Variable-Based Multi-Modual Data Caches for Clustered VLIW Processors", IEEE Computer Society, Sep. 2005, p. 3-13, St. Louis, MO.

Gonzales et al., "A Data Cache with Multiple Caching Strategies Tuned to Different Types of Locality", ACM, 1995, p. 338-347.

Lee et al., "Region-Based Caching: An Energy Delay Efficient Memory Architecture for Embedded Processors", CASES, 2000, p. 120-127.

Akioka, et al., "Ring data location prediction scheme for Non-Uniform Cache Architectures," *International Conference on Computer Design*, Piscataway 2008.

Jin, et al., "A Domain-Specific On-Chip Network Design for Large Scale Cache Systems," *13th International Symposium on High-Performance Computer Architecture (HPCA-13)*, Phoenix, 2007.

\* cited by examiner

SPIRAL CACHE POWER MANAGEMENT, ADAPTIVE SIZING AND INTERFACE OPERATIONS

The present Application is related to U.S. patent application Ser. No. 12/270,095, entitled "A SPIRAL CACHE MEMORY AND METHOD OF OPERATING A SPIRAL CACHE MEMORY" and filed contemporaneously herewith, U.S. patent application Ser. No. 12/270,132, entitled "TILED STORAGE ARRAY WITH SYSTOLIC MOVE-TO-FRONT REORGANIZATION" and filed contemporaneously herewith, and U.S. patent application Ser. No. 12/270,186, entitled "STORAGE ARRAY TILE SUPPORTING SYSTOLIC MOVEMENT OPERATIONS" and filed contemporaneously herewith, Each of the above-listed U.S. Patent Applications has at least one common inventor with the present application and is assigned to the same Assignee. The disclosures of all of the above-referenced U.S. Patent Applications are incorporated herein by reference.

BACKGROUND OF THE INVENTION

1. Field of the Invention

The present invention is related to cache memories, and more particularly to power management, adaptive sizing and interface operations in a spiral cache memory.

2. Description of Related Art

In present-day cache memory systems, there is a trade-off between the time required to access most-frequently-accessed values, and the number of such values available at the shortest access times. For example, in a traditional multi-level cache hierarchy, the level-one (L1) cache provides a uniform access time for a particular number of values, and control circuits and other algorithmic features of some systems operate to maintain the most-frequently-accessed values within the L1 cache. However, due to physical wiring constraints and the fact that electronic systems are limited by the propagation speed of electronic signals, the larger the L1 cache, the longer the (fixed) access time for the typical L1 cache. Similarly, as the size of the L1 cache is reduced in order to reduce the access time, the number of frequently-accessed values that are not stored in the L1 cache increases. The values not stored in the L1 cache are therefore stored in higher-order levels of the memory hierarchy (e.g., the L2 cache), which provides a much greater penalty in access time than that provided by the L1 cache, as the typical cache memory system is inclusive, that is, higher-order levels of the memory hierarchy contain all values stored in the next lower-order level. For practical purposes, a given higher-order cache memory is generally much larger than the cache memory of the next lower order, and given the propagation speed constraints mentioned above, e.g., RC wire delay and the eventual limitation of the inherent speed of electric field propagation in die interconnects, the higher-order cache is much slower, typically on the order of 10-100 times slower than the next lower-order cache memory. Also, the larger size of higher-order levels of a memory hierarchy leads to increased power consumption, and while it is possible to partition a cache-memory into partitions that can be individually power-managed, such power management requires re-organization and movement of data between the partitions so that reducing the size of the cache does not compromise correctness or cause performance degradation. Further, due to the need for re-organization in the cache, the speed at which power management operations can be performed is necessarily slow relative to the rate of data flow.

Further, the typical cache control algorithm employed in such cache memory systems typically handles one outstanding request to a cache level at a time. If an access request "misses" a cache, the access is either stalled or fails and must therefore be retried by the source of the request (e.g., a next lower-order numbered cache level or a processor memory access logic in the case of an L1 cache miss). The request is propagated away from the processor toward a higher-order level of cache memory, but retrying requests later at the L1 level ensures that access to the cache is still provided for other instructions that can execute while a hardware thread dependent on the requested value is waiting for the request to succeed. The alternative of stalling the entire processor pipeline is available, but provides an even more severe performance penalty.

Finally, the organization of values in a cache memory hierarchy is typically imposed by control structures within the cache memory hierarchy, e.g., cache controllers, that measure access frequencies according to schemes such as least-recently-used (LRU) and organize the levels of cache to maintain the most-frequently accessed values in the lower-order caches using cast-out logic.

Solutions other than the traditional cache memories and hierarchy described above have been proposed that permit multiple requests to be pipelined, but require the imposition of fixed worst-case access latencies and buffering to control the flow of the pipelined information. Further, non-traditional cache memories have been proposed that have a non-uniform access latency and that are organized without using additional access measurement and cast-out logic, but generally only offer a small potential improvement over the operation of present cache memories by swapping cache entries to slowly migrate frequently accessed values to "closer" locations, while migrating less frequently used values to "farther" locations. Such non-uniform cache memories also require additional pathways to perform the swapping and are typically routed systems, in which switching circuits are used to perform selection of a particular cache bank.

Therefore, it would be desirable to provide a cache memory and method of cache operation that can support multiple outstanding requests, provide very low latency of access for frequently accessed values and that can provide such operation without complicated and area-intensive routing circuits, as well as LRU and cast-out logic. It would further be desirable to provide such a cache in which power management can be applied without requiring re-organization of the cache contents, and which has an improved responsiveness.

BRIEF SUMMARY OF THE INVENTION

The invention is embodied in a spiral cache memory and method of operation. The spiral cache memory has multiple tiles with storage locations for storing values, each of which may be a smaller cache memory such as a direct-mapped cache or an associative cache.

Requested values are always provided at an interface to a front-most tile, which are satisfied from the cache itself or a higher-order level of a memory hierarchy that includes the cache. Storage locations are freed for storing the requested values if the cache is full by ejecting the values through a backing store interface. A buffer and flow control logic can be provided to prevent overflow of ejected values being written to the backing store. The spiral cache supports multiple outstanding requests, with no requirement that a value be returned to the front-most tile prior to another request being issued to the cache.

Power management of the spiral cache can be performed by dividing the cache into an active and an inactive portion, which may be adjusted on a per-tile basis. The boundary dividing the inactive portion from the active portion may be set by global control logic, or automatically determined by individual logic/control algorithms in the tiles themselves.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

Figure 1A:
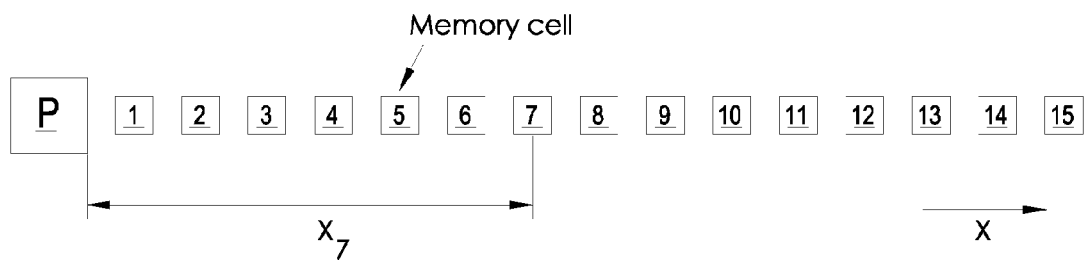
FIGS. 1A-1C are pictorial diagrams illustrating advantages of a placement technique within a spiral cache according to an embodiment of the present invention.

Introduction The present invention encompasses a memory circuit and method of operation that may be embodied in a cache memory structure that is structurally organized as a spiral and self-organizes its contents to place the most-recently accessed value at the front-most central storage location, while moving other values backwards at each access to a location other than the front-most central storage location. The resulting architecture provides a behavior according to an embodiment of the present invention, which provides each requested value at an interface to a front-most tile of a tiled structure, while making room for frequently requested values by ejecting less frequently requested values to a backing store. The spiral structure also enables power management that reduces power consumption of the memory circuit by partitioning the memory into an active and an inactive portion according to a boundary that may be adjusted on a per-tile basis. The fundamental principle underlying the spiral cache is that the traditional uniform-access-latency random access memory (RAM) model is no longer valid for single-chip architectures. Today's signal propagation delays across large dies at high clock frequencies are on the order of tens of clock cycles. At the same time, the advantages of single-chip integration necessitate large on-chip cache memories. Large and fast cache memories have long been viewed as a conundrum, because large memories require large spatial extent, but fast memories require small spatial extent, in order to minimize the propagation delays. The spiral cache according to the present invention provides large and fast caches by dynamically moving cache lines on a substantially continuous basis. The key characteristics of a spiral cache according to the present invention are:

1. A tiled architecture of small and fast (e.g. direct-mapped) caches balance wire delay and cache access time at the technological and physical limits;
2. The move-to-front heuristic is used to place and replace cache lines dynamically with theoretical guarantees on the maximum access time;
3. N tiles of the spiral cache behave like an N-way associative cache without the cost of traditional bookkeeping such as least-recently-used (LRU) counters;
4. The spiral cache architecture provides a conflict-free systolic pipeline capable of keeping multiple memory accesses in flight, without routing or switching delays and without requiring data buffering to effect flow control; and
5. The spiral cache architecture enables adaptive power management that maintains a compacted copy of the working set of values in an active tile set, while a dynamically adjustable inactive set of tiles can be placed into a power-down state.

While, as mentioned above, systolic architectures for cache memories have been proposed, in those designs, a worst-case access latency is imposed for each value requested, no matter the location in the cache memory. In such designs, requests must travel to the far end of the cache memory, and then traverse each block (or "tile" in the terminology used in the present application) on the way back to the processor or other requester. The spiral cache memory does not suffer the worst-case latency at each access. Instead, the majority of accesses incur the best-case latency of accessing the front-most tile only, and therefore the spiral cache provides improved performance. Other pipelined memory architectures require internal buffers for controlling the flow of data through a one-dimensional hierarchy of memory tiles. The storage array of the present invention does not require internal flow control buffers, and is not limited to one-dimensional designs. In fact, the storage array of the present invention as embodied in the spiral cache described in the examples below exploits the dimensionality of Euclidean space to reduce the worst-case access latency. A storage array in accordance with an embodiment of the present invention may be viewed as a so-called non-uniform cache architecture (NUCA), which may be implemented as a spiral cache.

Dynamic Cache Placement In order to reduce the access time for frequently-accessed values, and as mentioned above, the exemplary storage array disclosed herein dynamically self-organizes during accesses to place more frequently-accessed values toward the front-most location at the center of the spiral, and to place less frequently-accessed values toward the outside of the spiral. Signal propagation delays across wires are a primary design constraint for large and fast VLSI designs, and the following illustration is provided to explain the advantages of the memory architecture of the present invention.

A Spatial Memory Model In order to account for wire delays, a memory model is introduced below, by way of illustration, in which a width can be associated with each cell of a 1-dimensional memory array as illustrated in FIG. 1A. When a processor P issues a load request to storage cell 7, a request signal propagates across storage cells 1 through 6 to storage cell 7, and the data stored in storage cell 7 propagates in the reverse direction back to processor P. In order for a systolic implementation to provide movement between storage cells 1-7, which will be described in further detail as a mechanism for moving values in the spiral cache, signals must travel across one storage cell within one clock cycle. If storage cells 1-7 are implemented as single bit memories, the spatial extent of the illustrated memory array could be tiny and would support a high clock frequency to satisfy the one clock cycle requirement for a systolic design. However, if the storage cell is implemented as a larger memory structure, for example a direct-mapped or associative cache, a clock frequency can be assigned to match the access latency of the memory array. The smaller the memory array, the shorter the propagation delay of a signal traveling across the memory array, and therefore the higher the clock frequency that matches the access latency of the memory array. The access latency of the $i^{th}$ cell is the propagation time of a round-trip from processor P to cell I, which is given by $t_i=2x_i$ or $t_i=2i$ clock cycles under the assumption that a signal traverses the distance of a storage cell within one clock cycle. Therefore, in the illustration, $x_7$, the time required to access storage cell 7 is fourteen clock cycles. In the following description, a spatial-memory model is used to compare placement algorithms for caches.

Placement Algorithms A cache placement algorithm determines the map of program addresses to memory locations, which are generally cache lines. In conventional cache design, a placement algorithm such as least-recently-used (LRU) is used for managing the lines within the same set (also called congruence class) of a set-associative architecture. In the spatial memory model given above, the placement algorithm has a direct impact on the average access latency, even if the entire working set fits into the cache and no evictions occur due to conflict misses. The effect of different placement algorithms on the average access latency can be observed using a sample access trace:

load A, load B, load C, load C, load B, load B.

Figure 1B:
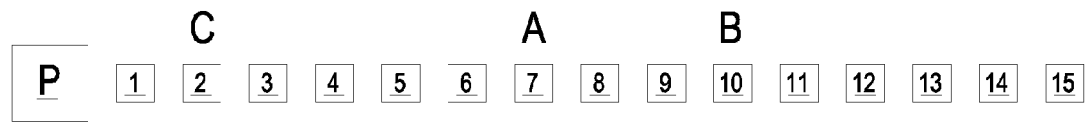

The simplest cache placement algorithm, variations of which are employed in direct-mapped cache design, interprets the least significant bits of a line address as the index of the cache line. Referring now to FIG. 1B, an example is given in which the mapping from addresses to memory cell indices, in which the value for address A is stored in storage cell 7, the value for address B is stored in storage cell 10 and the value for address C is stored in storage cell 2. It is noted that the above mapping precludes any control over the distance of the placement of the values from the processor. The effectiveness of the placement algorithm can be evaluated by computing the average access latency of the sample access trace. Assuming that the cache is initially empty, the first access due to instruction load A requires a backing store access, the loaded value corresponding to address A is stored in storage cell 7, and then incurs $t_7=14$ clock cycles of cache access latency. The next two load instructions load B and load C also require backing store accesses, whereas the remaining three instructions are served directly out of the cache. The access latencies (in cycles) are given below in Table I.

TABLE I

| instruction | load A | load B | load C | load C | load B | load B |
|---|---|---|---|---|---|---|
| access latency | 14 | 20 | 4 | 4 | 20 | 20 |
| backing store access | yes | yes | yes | no | no | no |

The total number of clock cycles consumed by access latency is 82, in addition to the cycles required for three backing store accesses. The average access latency, not counting the backing store accesses, is hence 82/6=13.7 cycles per access.

Figure 1C:
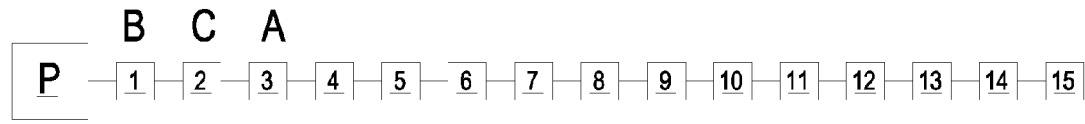

A more effective placement algorithm can be implemented by mapping addresses into storage cells 1-15 according to the frequency of accesses to the values corresponding to the addresses. The most frequently accessed value would be stored closest to processor P to minimize the average access latency. In the sample access trace, the most frequently accessed address is B, which is accessed three times. Hence, the value for address B should be stored in storage cell 1. The second most frequently accessed value is at address C, which should be stored in storage cell 2 and the third most frequently accessed value at address A would then be stored in storage cell 3, as illustrated in FIG. 1C. Analogous to the accounting of access latencies shown in Table I above, Table II below summarizes the access latencies for the cache value placement illustrated in FIG. 1C.

TABLE II

| instruction | load A | load B | load C | load C | load B | load B |
|---|---|---|---|---|---|---|
| access latency | 6 | 2 | 4 | 4 | 2 | 2 |
| backing store access | yes | yes | yes | no | no | no |

The sum of the access latencies in Table II is 20 clock cycles, and the average access latency is 20/6=3.33 clock cycles per access. Thus the average access latency of the direct-mapped placement illustrated in FIG. 1B, at 13.7 cycles per access, is more than four times larger than the placement based on access frequency illustrated in FIG. 1C.

Unfortunately, the access frequency of the trace of a program is generally not known in advance. However, there exists an on-line placement strategy that is probably within a factor of 2 of the best off-line strategy, known as "move-to-front." The move-to-front strategy moves each requested value to the front of the array. To make space for a new value in the front of the array, the value currently stored in the front of the array is pushed back towards the tail of the array. Since the placement of the values (e.g., cache lines) is dynamic, each value must be searched at subsequent accesses.

Figure 2:
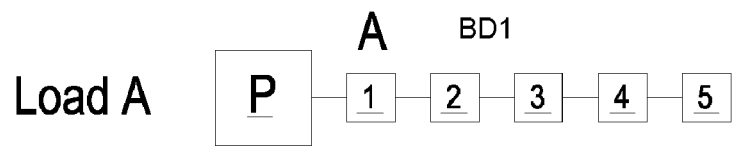
FIG. 2 is a pictorial diagram illustrating dynamic re-arrangement of values within a spiral cache according to an embodiment of the present invention.
Figure 2:
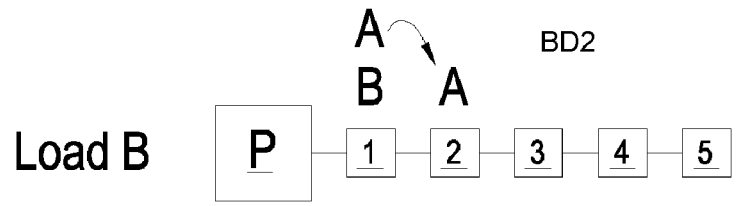
Figure 2:
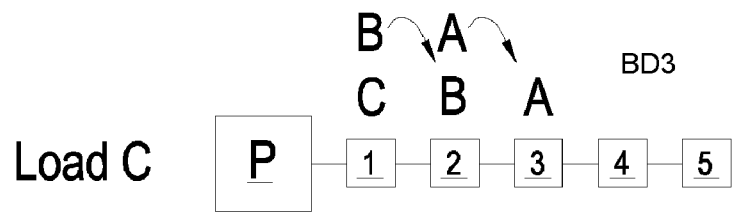
Figure 2:
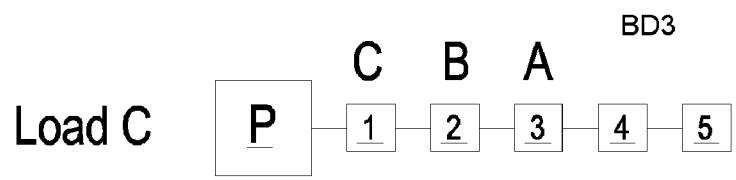
Figure 2:
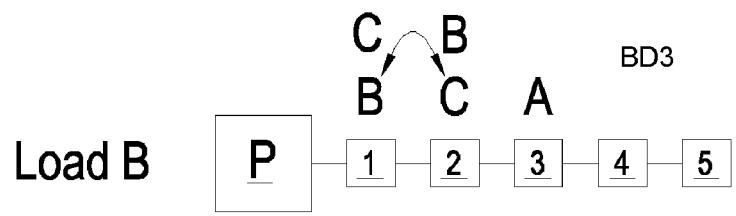
Figure 2:
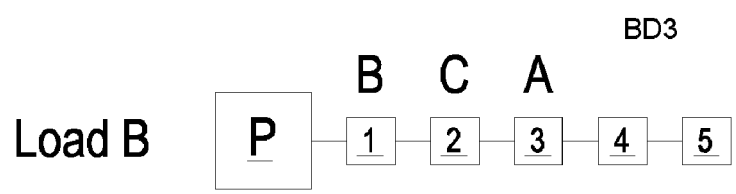

Referring now to FIG. 2, the placement of values according to their addresses by a move-to-front heuristic is shown. Unlike the static placements illustrated in FIG. 1B and FIG. 1C, the dynamic placement of FIG. 2 adapts the mapping to the access pattern of a program's trace during execution. The first three load instructions fetch the values from memory according to addresses A, B and C and move the associated data into front-most storage cell 1 at each access. Then, the second load at address C finds the requested value (i.e., finds an address match to C) in storage cell 1, incurring the minimum access latency of 2 clock cycles. Next, the second access at address B moves the requested value (along with its address) from storage cell 2 into front-most storage cell 1, effectively swapping the contents of front-most storage cell 1 with the contents of storage cell 2. The final access at address B finds the requested value in cell 1, causing the minimal access latency of 2 clock cycles. Table III, below, shows the access latencies for the placement scheme of FIG. 2.

TABLE III

| instruction | load A | load B | load C | load C | load B | load B |
|---|---|---|---|---|---|---|
| access latency | 2 | 2 | 2 | 2 | 4 | 2 |
| backing store access | yes | yes | yes | no | no | no |

The sum of the access latencies is 14 clock cycles, and the average access latency is 14/6=2.3 clock cycles per access. Ignoring the accesses to main memory, it is noteworthy that the move-to-front heuristic produces an even smaller average access latency than the placement based on access frequency, even though the access-frequency placement is based on the knowledge of the entire trace, whereas the move-to-front placement considers one access at a time only.

The Move-to-Front Heuristic The move-to-front heuristic has been shown to be 2-competitive in the context of maintaining a list, in that, move-to-front is, to within a constant factor, as efficient as any algorithm, including those based on knowing the entire sequence of operations. The move-to-front heuristic enables the spiral cache to be organized, such that the total access latency due to load, store, or eviction operations is no worse than twice the access latency incurred by any algorithm that has complete knowledge about the entire trace. The spiral cache of the illustrated embodiment of the present invention implements a placement algorithm based on the move-to-front heuristic. Its 2-competitiveness provides a bound on the access latency of this implementation, and therefore provides a theoretically guaranteed limit on access latency.

Further illustrated in FIG. 2, is a boundary between active and inactive tiles, i.e., the boundary between tiles having stored values and those which are empty. Since the move-to-front heuristic places values in the front-most location of the spiral cache and pushes back values until they fill the first unused location closest to the processor, the working set of a program is compacted at the head of the linear array. As shown in FIG. 2, after the first load instruction "load A" is executed, the working set consists of the value at address A. The value at address A is placed in tile 1, and a boundary BD1 partitions the spiral cache into a set of active tiles (tile 1), and a set of inactive tiles (tiles 2-5). The working set increases due to the subsequently-issued load instructions "load B" and "load C", ultimately causing the working set to occupy three tiles (tiles 1-3). The boundary between the active and inactive tiles moves accordingly, first to encompass two tiles in the active portion (boundary BD2) and finally to encompass three tiles in the active portion (boundary BD3). Programs having a working set larger than the cache size move the boundary beyond the tail tile of the cache, such that the active tile set includes all of the tiles in the spiral, reducing the size of the inactive tile set to zero. In FIG. 2, the working set is assumed to be smaller than the spiral cache, such that boundary BD3 defines the boundary between the active tiles and a non-empty set of inactive tiles. As will be described further below, the move-to-front boundary, which exists due to the "compaction effect" of the move-to-front heuristic as a placement strategy, can be detected and exploited for power management, among other uses.

Architecture of a Spiral Cache A spiral cache according to the illustrated embodiment, exploits the dimensionality of Euclidean space to reduce the worst-case access latency, and offers a systolic data flow capable of pipelining multiple accesses. In the following illustrative embodiment the storage cell associated with a tile of a spiral cache is itself an entire storage array. In general, an efficient tile design balances the size of the tile's array such that the propagation delay of the wires connecting neighboring tiles is equal to the access latency of the tile's array. One embodiment of the spiral cache uses a fast, direct-mapped cache within each tile, and uses a cache line as the unit of data transfer between the tiles. In the present application, the memory within a tile is referred to as the memory array irrespective of the particular cache architecture and physical layout that are employed in the tiles. The tiles further provide the movement functionality in the illustrated embodiment as described below according to a distributed control logic provided by control logic of the individual tiles, although in an alternative embodiment, global control logic may be used to control the information flow.

Figure 3:
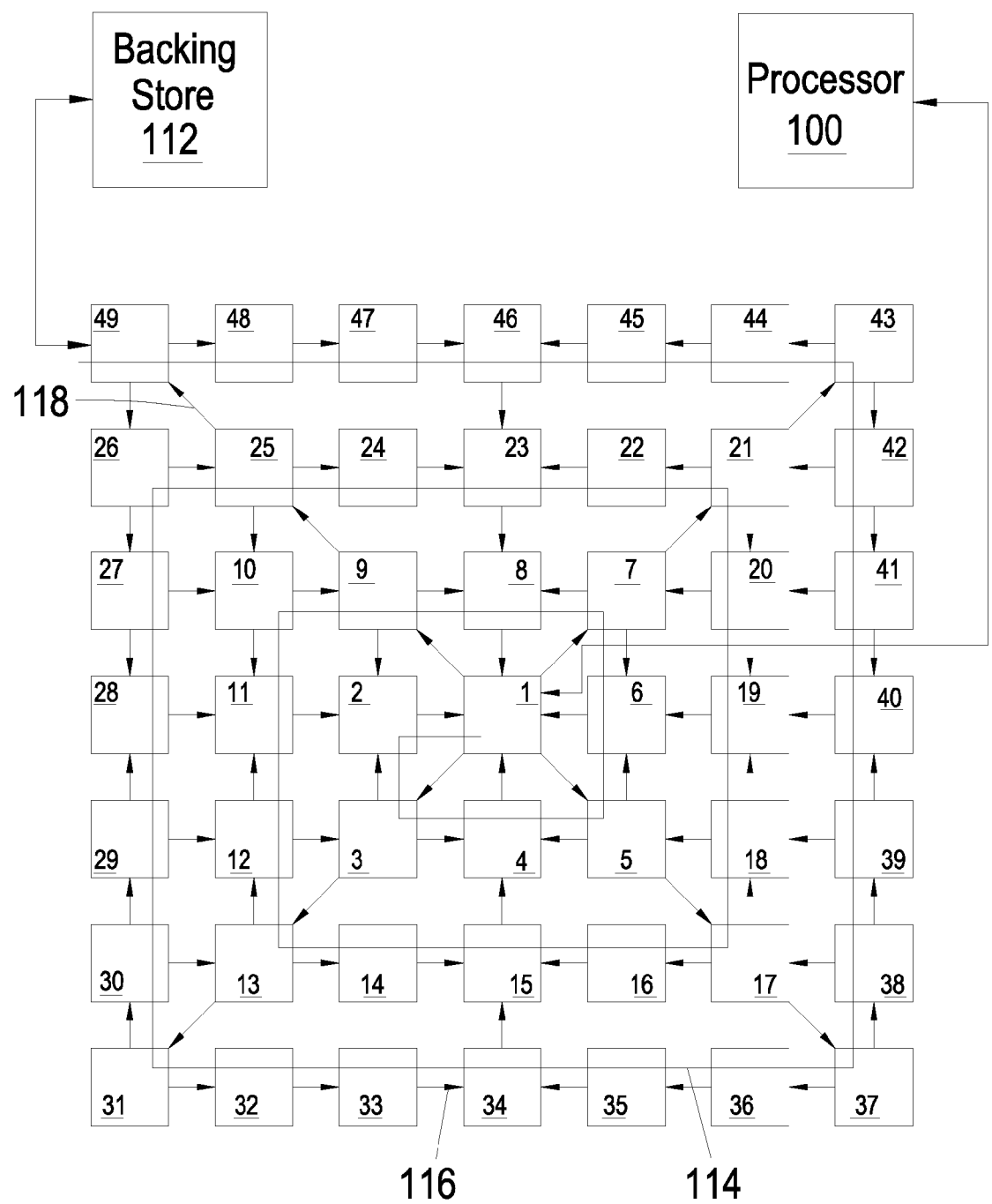
FIG. 3 is a block diagram of a spiral cache according to an embodiment of the present invention.

Basic Spiral Cache Architecture The basic architecture of a 2-dimensional spiral cache in accordance with an embodiment of the present invention is shown in FIG. 3. The spiral nature of the exemplary cache can be visualized as a "wrapping" of the linear array of FIG. 1A around tile 1, such that the linear array now forms an Archimedes spiral with a Manhattan layout. A processor 100, lower-order cache, or other data/instruction sink connects to the front end of the spiral at front-most tile 1. The tail end of the spiral, in the example at tile 49 of the 7×7 matrix of tiles, connects to a backing store 112, which may be a higher-order cache, system memory, disc storage or other data/instruction storage. Before discussing the interconnect network(s) illustrated in FIG. 3, it is useful to describe in more detail the operation of a simpler linear array. When implementing the move-to-front based placement algorithm on the linear array in FIG. 1A, two functionalities are required: (1) move data to the front; and (2) push data back to make space for an item that is moved to the front. For example, consider the second load instruction for address B in FIG. 2. The address-to-cell mapping prior to executing the second load B instruction is C→1, B→2, A→3. To move the value corresponding to address B to the front, the array must be searched for B by scanning the array from the front. When address B is found in storage cell 2, the associated data are communicated towards the processor, leaving storage cell 2 empty. When the value corresponding to address B arrives at front-most storage cell 1, front-most storage cell 1 is "freed" by swapping the value corresponding to address C with the value corresponding to address B. Then, the value corresponding to address C is communicated towards the tail end of the spiral until an empty cell is encountered. In the example, storage cell 2 is free to accommodate the value corresponding to address C. In general, storage cell contents are continually swapped backwards toward the tail, effectively pushing back the existing contents of the storage cells until an empty cell is encountered or the value stored at the tail end is swapped out into backing store 112.

For the spiral cache illustrated in FIG. 3, the spiral network 114 of next neighbor connections is dedicated to the push-back operation. Doing so enables the spiral cache to move one new data item into front-most tile 1 during every systolic cycle, because a fully occupied spiral cache can perform one push-back swap of the contents of each storage cell in each systolic cycle. Details of the systolic cycle in a spiral cache according to an embodiment of the present invention are provided hereinafter below in the section entitled Systolic Design. In essence, swap-back and move-forward data arriving at a tile are automatically directed according to the flow patterns described in further detail below. Tiles at edges of the spiral cache array (i.e., the storage cells in the outer turn of the spiral) have any ports that extend toward the outside of the spiral terminated by appropriate circuitry, so that a single tile design can provide all of the functionality of move-to-front and swap backward according to the global clock that provides the systolic pulse operating the spiral cache as described below.

To support the search for and communication of a requested value to front-most tile 1, a second network is provided, a grid-style move-to-front network 116 of next neighbor connections as indicated by the horizontal, vertical and diagonal arrows in FIG. 3. From a high-level perspective the operation of the move-to-front network is straightforward. For example, when processor 100 requests a value that is stored in tile 49, the processor issues the request at front-most tile 1. The request travels along a diagonal path 118 toward (corner) tile 49. The requested value is found in tile 49, and the value (along with the value's address and flags) moves to front-most tile 1 in an xy-routing pattern via tiles 48, 47, 46, 23, 8, in the specified order. Defining P(a, b, c, d . . . ) as a path of transfer of values from tiles a to b, b to c, c to d, and so forth, it is noted that the travel time along path P(1, 9, 25, 49, 48, 47, 46, 23, 8, 1) involves 10 hops, or 10 cycles according to the spatial memory model described above. The analogous access latency in a linear array of 49 tiles would be $t_{49}=2\times 49=98$ cycles. Thus, the 2-dimensional spiral organization reduces the access latency approximately according to the square root of the linear access time for an "un-wrapped" spiral. In general, a k-dimensional spiral having N tiles has a worst-case access latency of $\theta(N^{1/k})$. Worst-case access latency as used herein refers to the latency of accessing a tile with the largest Manhattan distance from tile 1.

Geometric Retry A k-dimensional spiral cache with N tiles reduces the worst-case access latency compared to a linear array from $\theta(N)$ to $\theta(N^{1/k})$. The move-to-front heuristic acts to compact the working set at the front of the spiral, and keeps the most frequently accessed data items near front-most tile 1. The above property cannot be exploited with a search strategy that performs a lookup at each tile, because this would require broadcasting each request to the outer boundary of the cache which incurs the worst-case access latency. Instead, the illustrated spiral cache, in accordance with an embodiment of the present invention, implements a search strategy with a best-case access latency of $\theta(1)$ if the request "hits" in (i.e., the requested value is located in) front-most tile 1. Since the values stored in the spiral cache are moved according to the move-to-front placement algorithm described above, processor 100 does not have information specifying a tile where a particular value is stored. Therefore, each access causes a search for the value that corresponds to an address. Rather than look-up the location of the value in a table, such as is typically performed in a conventional associative cache memory, in the spiral cache of the depicted embodiment of the invention, the look-up is performed at each storage cell, by propagating the request to the storage cells, and then returning the requested value from the storage cell at which the requested value is found. According to the assumptions underlying the move-to-front competitiveness result for a linear array given above, a search should scan the tiles from front-most tile 1 towards the tail end of the spiral at backmost tile 49. In a 2-dimensional spiral as illustrated in FIG. 3 the tile array is scanned in a radial fashion. First, a check is performed to determine whether the requested value is stored in front-most storage cell 1. If the value is not located in front-most storage cell 1, the "ring" of radius 2 consisting of tiles 2-9 is checked. If the value is also not found in tiles 2-9, the ring of radius 3 formed by tiles 10-25 is checked and so forth, scanning the tiles on rings with increasing radius. The outwardly propagating request is handled by the tiles making copies of received requests when the address specified in the requests is not found in the tile. In the present disclosure, the terms "ring" and its "radius" are used loosely, referring to their conformal square maps in the Manhattan layout. However, it is understood that similar concepts apply in layouts that differ from a Manhattan layout, and the present invention is not limited to a particular square layout or a layout of another shape or necessarily to a spiral arrangement, as the behavior and power management of a storage device in accordance with the present invention may be provided by other layouts in accordance with alternative embodiments of the invention.

Figure 4A:
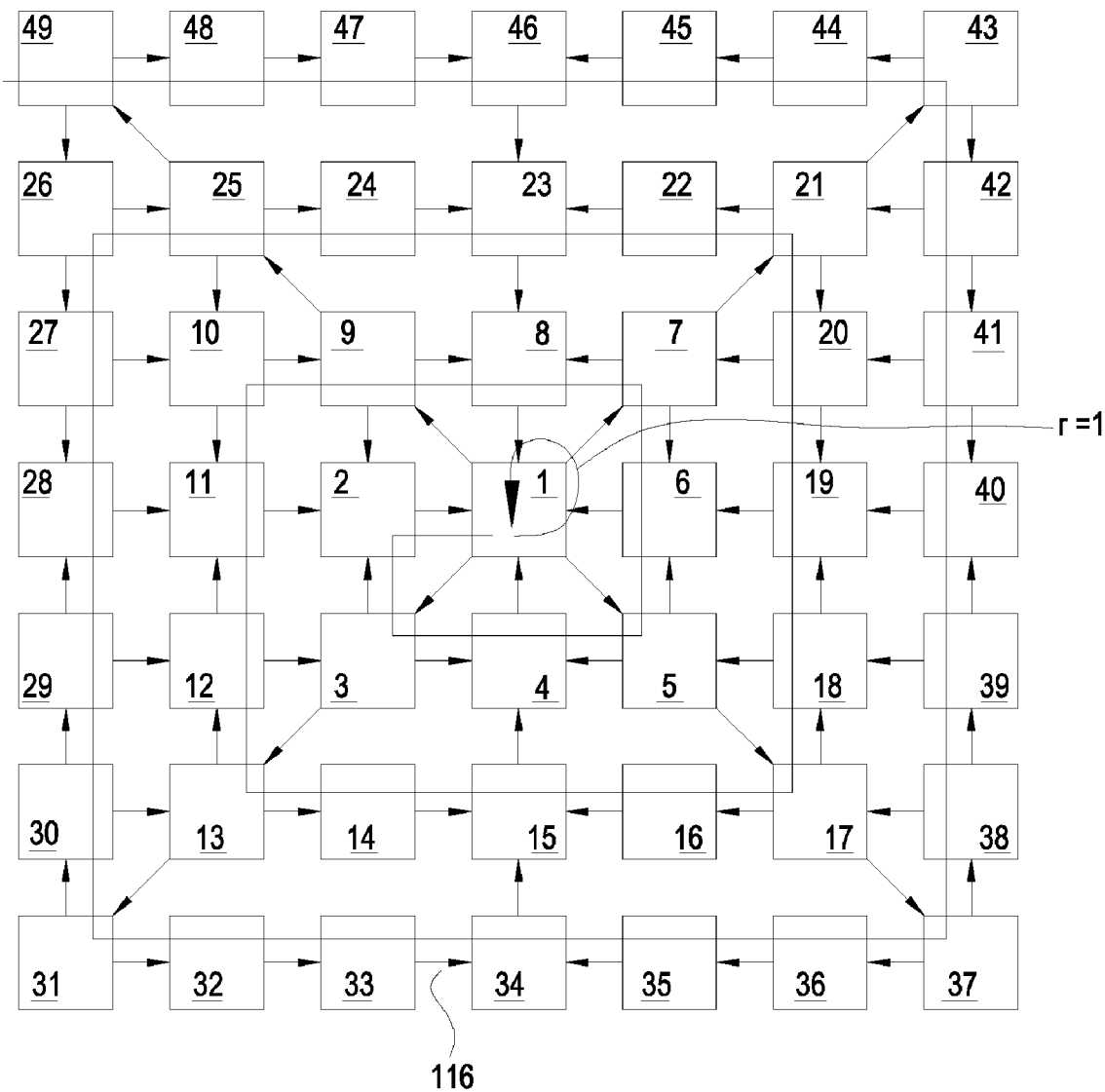
FIGS. 4A-4C are block diagrams illustrating geometric retries within the spiral cache of FIG. 3.
Figure 4B:
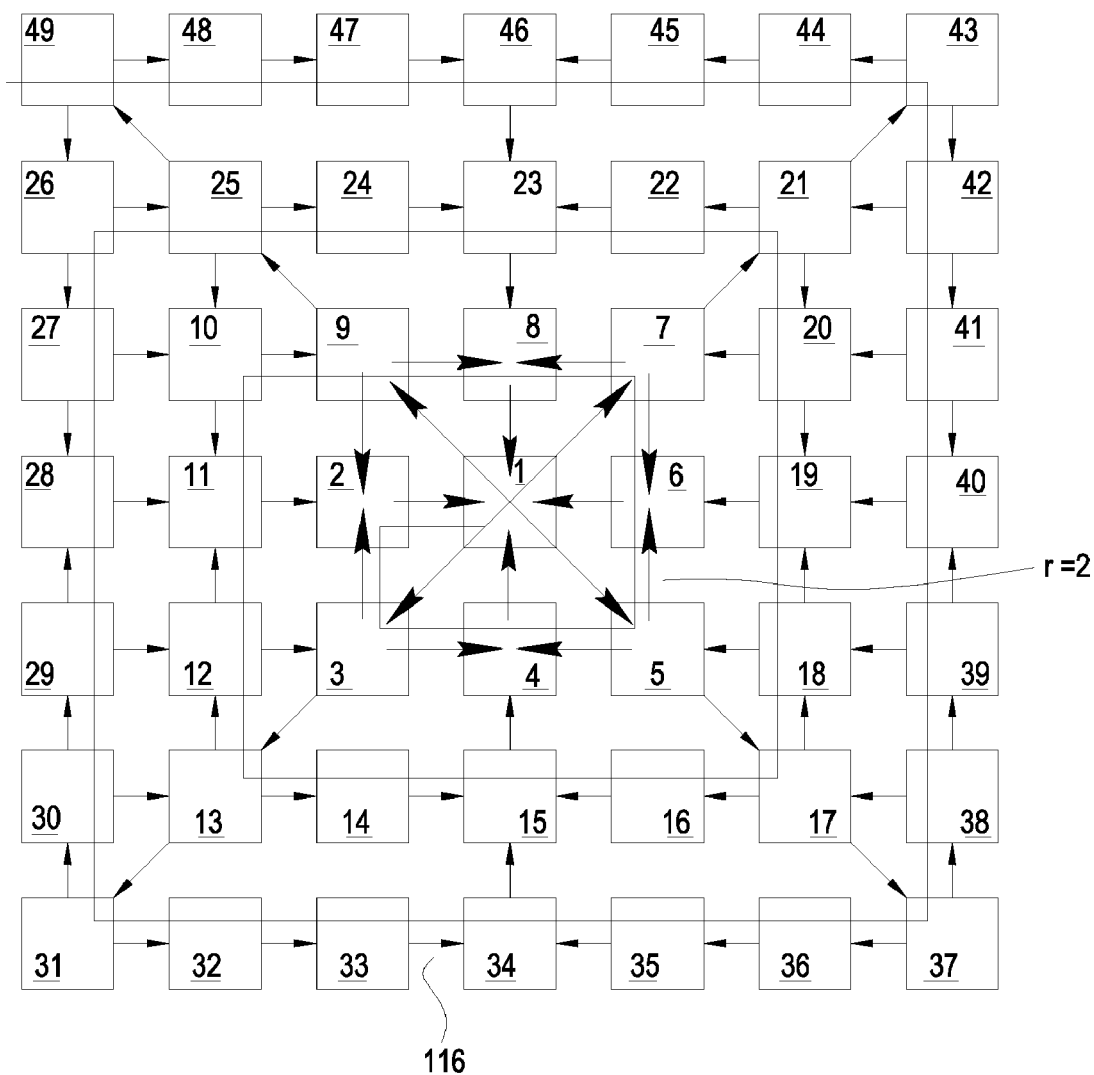
Figure 4C:
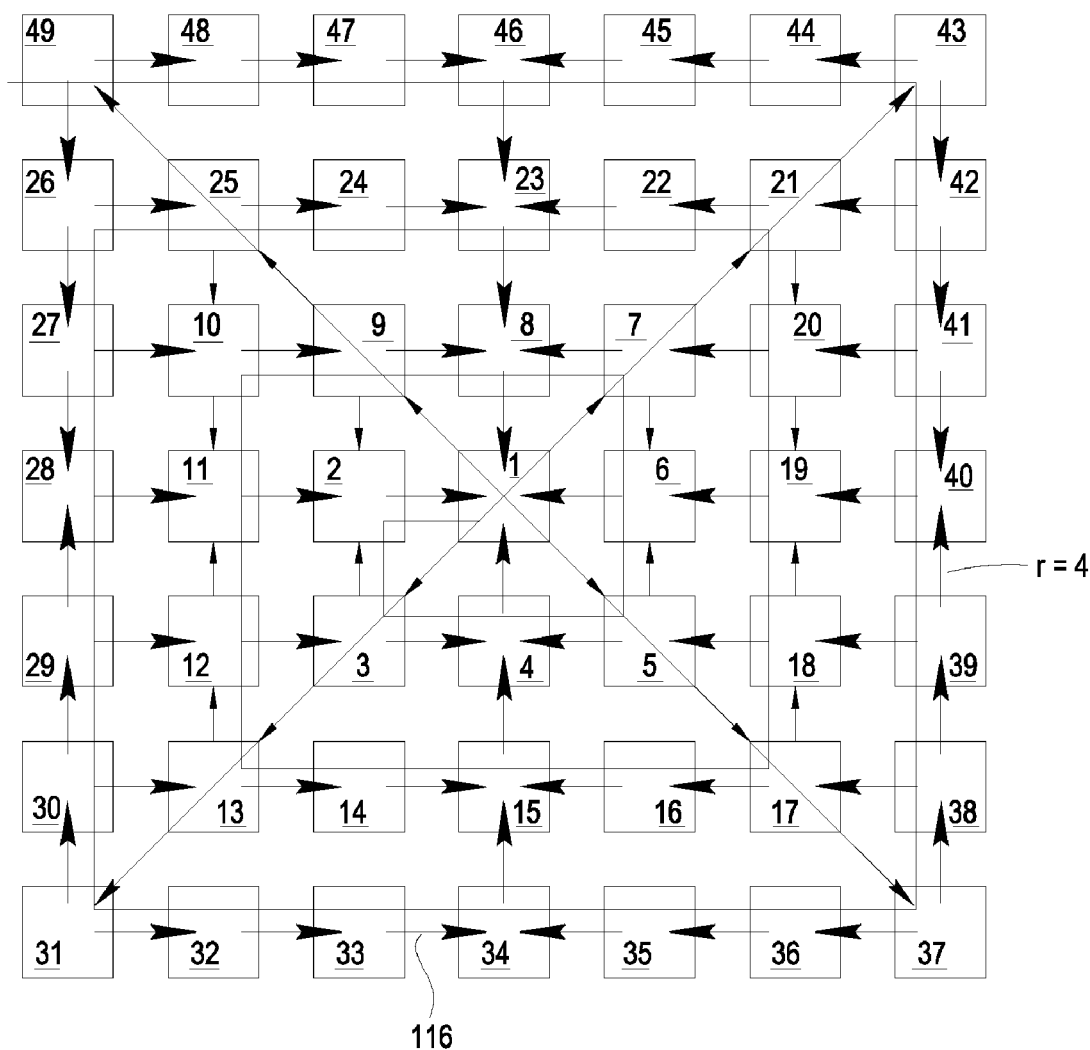

An advantage of the scanning search strategy in the spiral cache of the present embodiment is that it produces a best-case access latency of 1 cycle whenever the requested address is found in tile 1. Due to the move-to-front strategy, this best-case scenario should be achieved frequently. One problem encountered in such a scanning search strategy is the unpredictable flow of values that are moving toward front-most tile 1 when multiple access requests are in flight simultaneously. In order to avoid providing internal buffering and flow control mechanisms, which incur an unnecessary circuit area, circuit power and delay penalty, in accordance with an embodiment of the present invention, a different search strategy may be employed based on the principle of geometric retry. FIGS. 4A-4C illustrate how the move-to-front network 116 supports a search strategy with geometric retry in accordance with an embodiment of the present invention, which operates according to the following principle: "if an item is not found in the area of radius $2^s$, retry the search in the area with radius $2^{s+1}$." FIG. 4A illustrates the procedure for initial radius $2^0=1$ (r=1), which represents the lookup in front-most tile 1. If the lookup in front-most tile 1 fails, all tiles within radius $2^1=2$, (i.e. tiles 2-9 r=2) are searched, and also front-most tile 1 is searched again at radius 1, as illustrated in FIG. 4B. If the search fails again, the search radius is again doubled to $2^2=4$, which covers the entire spiral cache (i.e., tiles 1-49 for r=4) as illustrated in FIG. 4C. If the search of the entire spiral cache fails, the requested value is not in the cache and processor 100 must access backing store 112 to fetch the requested value.

The data flow through the spiral cache during a scanning search is illustrated in FIGS. 4A-4C by the large arrows. The particular search case with retry radius $2^0=1$ is trivial, and retry radius $2^1=2$ is a smaller version of the larger scenario exhibited by retry radius $2^2=4$. The communication pattern for only the top right quadrant in FIG. 4C will be described below, as the other quadrants operate analogously and are searched simultaneously. A central principle of the request data flow in a spiral cache in accordance with the illustrated embodiment of the invention, is that requests can and will be copied, and multiple copies of any given request will be in-flight within the spiral cache array, unless the request is satisfied immediately with a look-up in front-most tile 1. A copy of the request is sent to each of the quadrants on each retry and requests can be further copied within the quadrants, as will be described in further detail below. A request propagates from front-most tile 1 outwards along a diagonal path to tile 43 in the top right corner of the spiral cache. At tile 43, the request is simultaneously sent in a direction leftward in the Figure to tile 44 and downward to tile 42, and therefore two copies of the request are generated from one original copy of the request. The leftward communication path continues until tile 46 is reached, and then turns downward toward front-most tile 1. The downward path is followed until tile 40 is reached, where the request is directed to the left toward front-most tile 1. In each of the tiles on the downward path, a left-directed path is split off by sending a copy of the request to the left. From tile 42, the left-directed path traverses tiles 21 and 22, and is then directed downward at tile 23. From tile 41, the left-directed path traverses tiles 20 and 7, and is directed downward at tile 8. In the above-described path traversal, each tile of the quadrant is visited, and a lookup is performed with the address provided with the request.

The geometric retry employed in the illustrated embodiment does not change the asymptotic bounds due to move-to-front or due to the dimensionality of the spiral. It merely introduces constant factors. More explicitly, the following principles hold:

1. Geometric retry at most doubles the worst-case access latency.
2. Geometric retry succeeds to find an item within a factor of 4 of the scan access latency.

These statements are straightforward to prove and carry over to higher-dimensional spiral caches as well.

Figure 5:
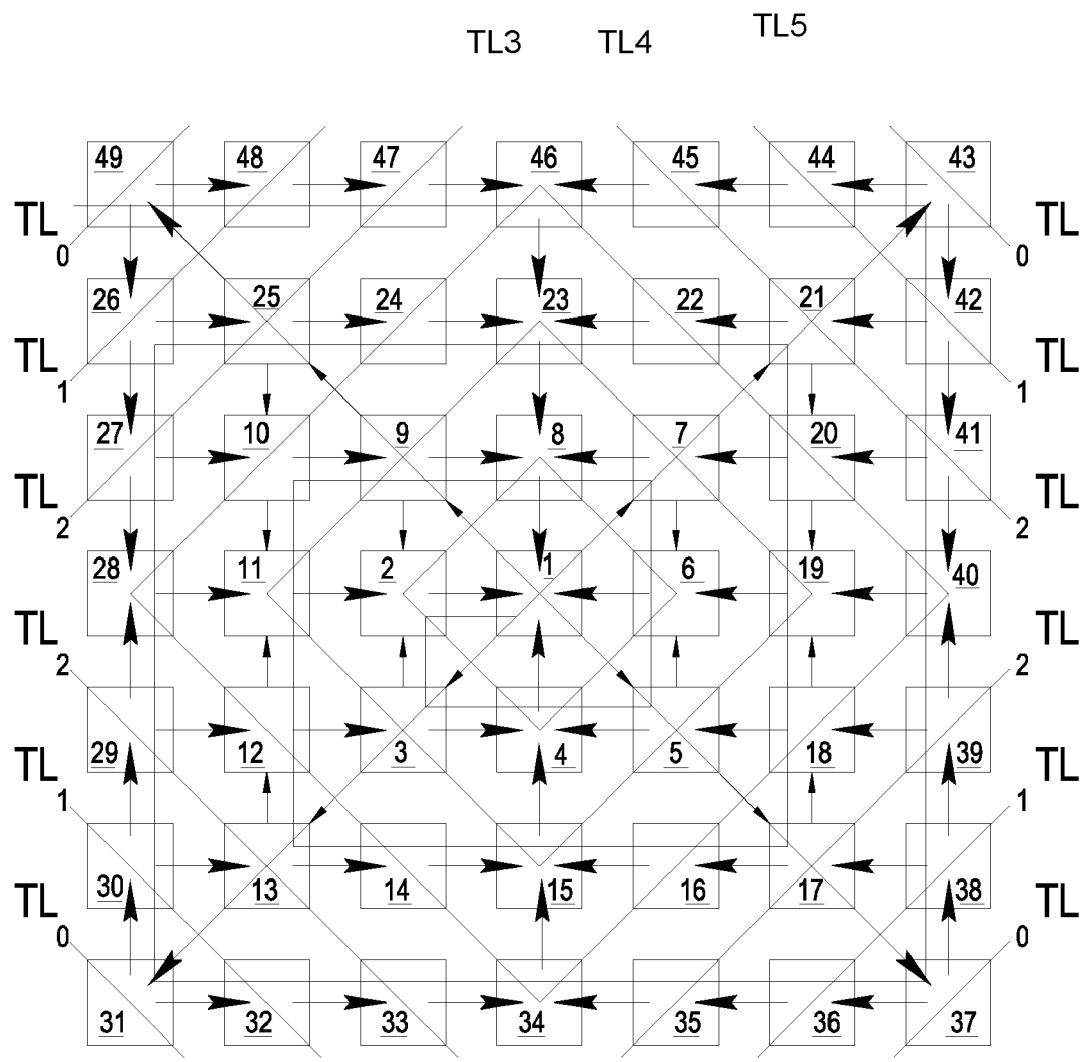
FIG. 5 is a block diagram of the spiral cache of FIG. 3, showing systolic timelines of data flow during operation.

Systolic Design The basic spiral architecture augmented with the geometric retry mechanism can be extended into a systolic architecture in accordance with an embodiment of the invention, providing both low access latency and high throughput at the same time. A timeline is defined as is a subset of tiles that receive a copy of one request for a particular value (i.e. a request containing one address) at the same time. FIG. 5 shows timelines TL0-TL5 that a request traverses from the corners of the cache boundary towards front-most tile 1. Assuming that a request has travelled along the diagonals to corner tiles 49, 43, 37, and 31, at the leftmost and rightmost boundary tiles, the request is duplicated into a horizontally-directed copy and vertically-directed copy as described above. Assuming that a request reaches the corner tiles during cycle 0, it reaches the tiles specified on the timelines TL1 for cycle 1 next. For example, the request in the top left corner tile 49 reaches tiles 26 and 48 during cycle 1. This communication pattern repeats up to timeline TL3, where multiple incoming requests are present at tiles 46, 40, 34, and 28. Note that the requests arriving at each of these tiles must bear the same address, due to the timing of the requests, the point of generation of request copies and the directing of the requests. Similarly, tiles 23, 8, 1, 4, and 15 operate in a conflict-free manner, because each of multiple incoming requests carries the same address during a cycle, and the tiles pass this address along to the neighboring tile connected to their output. In case of tile 1, the output is the processor.

The above-described data flow is conflict-free because a spiral cache with move-to-front placement stores the data associated with each address in at most one tile. Either the address is not in the spiral cache at all or it is mapped to (and it's value stored in) exactly one tile. Thus, at most one of the requests can "find" data in a tile, and move the retrieved data to front-most tile 1. Each of the tiles having multiple inputs either passes the already retrieved data from one of its inputs to an output directed towards front-most tile 1, or receives the same address on each of the inputs, performs a local lookup, and, in case of a hit, retrieves and passes the data or, in case of a miss, passes the address on to the front-directed output. A systolic data flow enables the pipelining of multiple requests. Each request is sent from front-most tile 1 via the diagonal paths to the corner tiles of the array, and the request moves via timelines TL0-TL5 back to front-most tile 1. Viewing each tile on the diagonal paths and each timeline TL0-TL5 as a pipeline stage, the 7×7 spiral cache in FIG. 5 has effectively 10 stages. The illustrated spiral cache generates a throughput of one request per cycle, and maintains 10 requests in flight.

In general, an N×N spiral cache with odd N has [N/2]+2[N/2], or approximately 3/2N, pipeline stages.

To obtain a throughput of one request per cycle in the presence of geometric retry, one additional feature is needed. When a tile on the diagonal receives both of: 1) a new request having a retry radius equal to the diagonal tile's radius; and 2) a returning request on the way back to front-most tile 1 during the same cycle, the returning request must have priority. Otherwise, the systolic pattern of requests traveling along the timelines would be destroyed. Rather than abandoning the new request, it is sent outwards on the diagonal paths with an incremented retry radius. This forwarded request can turn toward the front when it encounters a "bubble" in the pipeline of timelines TL4, TL2, and TL0 on the diagonal tiles. If there is no bubble available, the request will travel to the corners on the boundary associated with timeline TL0, where it is guaranteed by structural and functional design to return without conflict toward the front.

Figure 6:
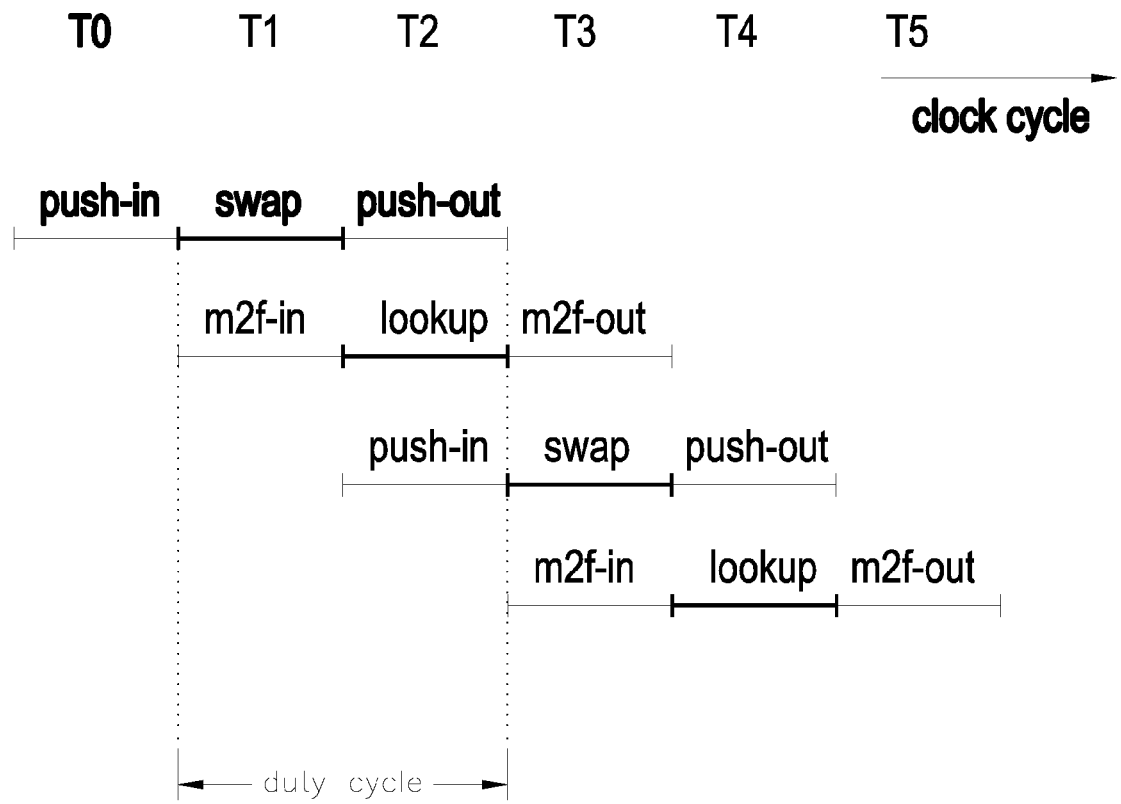
FIG. 6 is a timing diagram illustrating cache micro-operations within the spiral cache of FIG. 3.

In order to perform the above-described operations, the move-to-front and push-back accesses within the tiles must be scheduled. Since the systolic design of the spiral cache in the illustrative embodiment permits one move-to-front lookup operation and one push-back operation per cycle, in a spiral cache in accordance with one embodiment of the present invention, a micro-pipeline with a duty cycle consisting of two clock cycles is included. During the first clock cycle T1, a swap operation swap is performed as part of the push-back functionality, storing input data push-in provided by push-back network 114 and providing the contents of the tile (if non-empty) as output data push-out on push-back network 114. During the second clock cycle T2, a cache lookup lookup is performed to implement the search functionality associated with a request m2f-in moving to the front and moving the request forward on move-to-front network 116 as request m2f-out, populating the data area associated with the request and setting flags if the lookup succeeded. FIG. 6 illustrates the pipelining of cache accesses and next-neighbor communications from the perspective of one tile. A swap operation is incorporated in the illustrative spiral cache tile array design, which: (1) applies the push-back address, (2) reads the cache contents, and (3) writes the push-back data, which can be peformed within one clock cycle to meet the two-cycle operation described above, and may include time-borrowing techniques to provide such operation. If a swap operation cannot be practically implemented in a particular design, the swap can be implemented by a one-cycle write operation performed after a one-cycle read operation, and extending the duty cycle of the micro-pipeline to three clock cycles.

Tiled memory arrays according to other embodiments of the present invention may be implemented using different geometries to yield cache designs having different tradeoffs of dynamic value movement and the proximity of most-recently-used values to the front-most tile. For example, rather than swapping each non-accessed value backward at each access, other heuristics may be applied, including those conditioned on most-recently-used (MRU) counters or other strategies, as long as requested values are always moved to the front-most tile. In the spiral applications described above, there are advantages to the particular spiral cache architectures that are related to its ability to keep the most recently used values in close physical proximity of the processor (or other data sink) for as long as possible. The move-to-front heuristic ensures that access latencies of recently used values remain small, while the swap-backward heuristic ensures that recently used values are not moved farther from the processor than is necessary.

Memory Hierarchy design with a Spiral Cache The spiral cache architecture described above uses a move-to-front heuristic to place and replace cache lines in the tiles of the spiral cache. The spiral cache itself is not considered a memory hierarchy. Instead, a spiral cache is a systolic memory architecture having non-uniform access latencies. Although the spiral network imposes a linear structure on a two or higher-dimensional spiral cache, the linear structure is incomparable to a linear memory hierarchy, as the tiles are not organized into tiers, but have different access latencies, according to the move-to-front organization. In an analogy, the diamond shaped set of timelines TL0-TL5 in FIG. 5 comes closest to mapping a virtual hierarchy onto the spiral cache, with each timeline representing a hierarchical level. However, it is clear that timelines TL0-TL5 bear little resemblence to a typical tier in a memory hierarchy, as the structures and control operations that implement timelines TL0-TL5 are intimately entertwined with the operation and structures of the other "levels" and the values are dynamically moving across the levels to perform the move-to-front and push-backward operations. Other features further distinguish a spiral cache from a conventional memory hierarchy. For example, most caches in traditional memory hierarchies are inclusive, whereas the tiles in the spiral cache are exclusive. In the spiral cache a particular value exists in at most one tile at a time. However, none of the above distinctions precludes using a spiral cache to implement a cache level in a traditional memory hierarchy, as will be illustrated below.

Figure 7A:
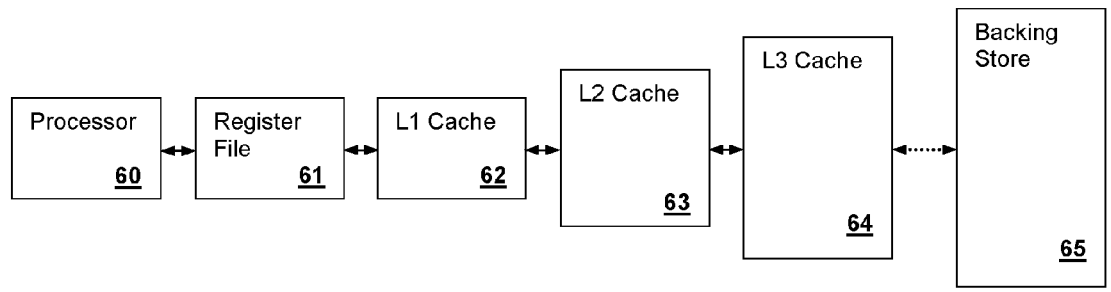
FIG. 7A-7B are block diagrams illustrating a memory hierarchy modified to incorporate a move-to-front placement strategy in an exclusive hierarchy.

One or multiple caches of a conventional memory hierarchy may be replaced with a spiral cache. Referring to FIG. 7C, a memory hierarchy in which an L2 cache of a conventional hierarchy (e.g., the hierarchy illustrated in FIG. 7A) is implemented as a spiral cache 63A, in accordance with an embodiment of the present invention. L2 spiral cache 63A stores values in a manner that provides the same functionality as a conventional exclusive L2 cache, but with consequent performance benefits as described above. However, there is a difference in the interfaces between the spiral cache and the other cache levels. The illustrated L2 spiral cache 63A has 49 tiles as in the spiral cache illustrated in FIG. 3 above, but only tiles 1 and 49 are shown for clarity. The interface between L1 cache 62 and L2 spiral cache 63A is a read/write port, controlled by L1 cache 62. Since L2 spiral cache 63A supports multiple outstanding requests, L1 cache 62 can issue multiple requests to L2 spiral cache 63A without waiting for earlier requests to complete. Further, the interface between L2 spiral cache 63A and L3 cache 64 includes two separate ports. Tile 1 of L2 spiral cache 63A connects to the read port of L3 cache 64 to request data that misses in L2 spiral cache 63A. The push-back network connects tail tile 49 of L2 spiral cache 63A to the write port of L3 cache 64. Since L2 spiral cache 63A may issue both read and write requests simultaneously to L3 cache 64, L3 cache 64 must arbitrate between the requests or implement a dual-ported structure capable of handling one read and one write request concurrently. Furthermore, since L3 cache 64 is generally slower than L2 spiral cache 63A, a flow control mechanism is required between L2 spiral cache 63A and L3 cache 64.

Despite the differences between the spiral cache and traditional memory hierarchies noted above, features of the spiral cache may be applied to other memory designs including memory hierarchies. Referring now to FIG. 7A, a hierarchical memory system is illustrated in which features of the spiral cache of FIG. 3 may be integrated. A processor 60 is coupled to (or includes) a register file 61, which effectively serves as a level-0 cache, followed by a linear array of caches proceeding from L1 cache 62, through L2 cache 63 and L3 cache 64, and eventually to a backing store 65 at the far end of the memory hierarchy. Although both capacity and access time of traditional caches increase with distance away from processor 60, as illustrated in the Figure by the relative size of the blocks depicting caches 62-64, and backing store 65, the depicted hierarchy may be viewed as an instance of a linear array as described above with respect to FIGS. 1A-1C. If a move-to-front heuristic is employed for the placement strategy used in the traditional hierarchy and all caches are made exclusive, the move-to-front placement would use L1 cache 62 (or optionally register file 61) as the front-most tile. Since the access times of caches 62-64 vary, it does not make sense to apply a systolic design across the cache boundaries. Instead, a more general network architecture based on flow-controlled buffers is used, as illustrated in FIG. 7B.

Figure 7B:
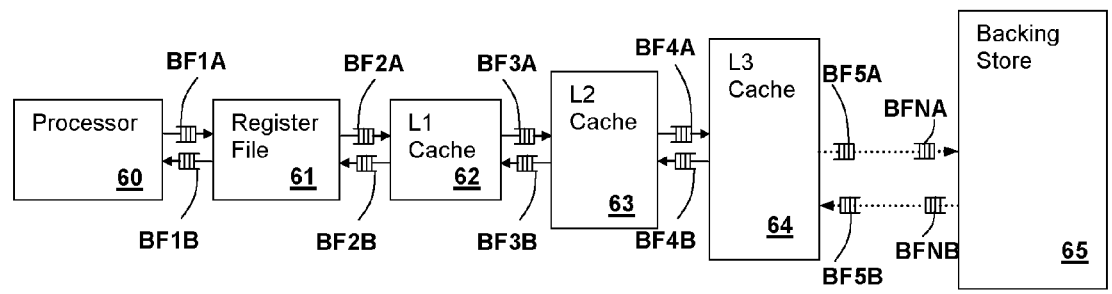
Figure 7C:
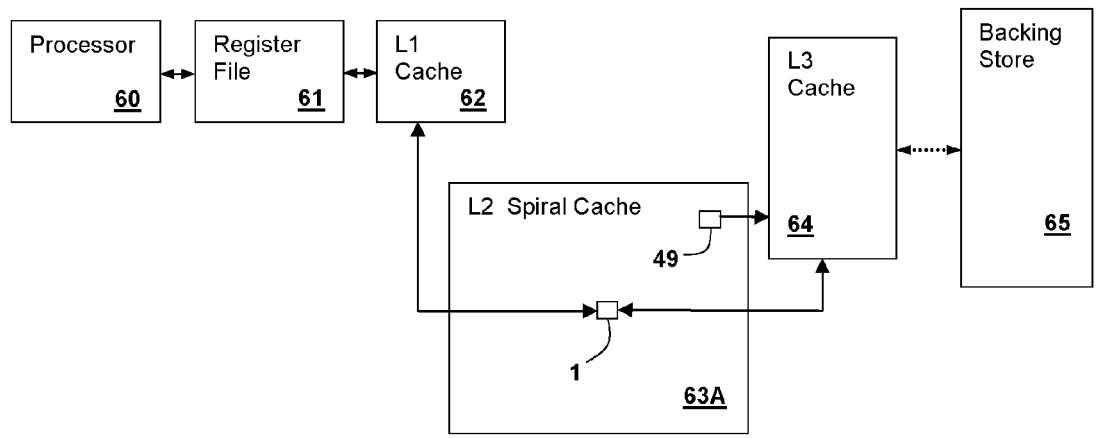
FIG. 7C is a block diagram of a memory hierarchy including a spiral cache in accordance with embodiments of the present invention.

The memory hierarchy of FIG. 7B, includes the blocks depicted in FIG. 7A, and further includes push-back buffers BF1A-BFNA and move-forward buffers BF1B-BFNB, which include associated flow control logic and signaling, to prevent buffer overflow and maintain a balance between the rates of values entering and leaving caches 62-64. When processor 60 sends a load request toward backing store 65, the load request is sent to each cache 62-64 in turn, until a hit occurs. When the request arrives at one of caches 62-64, a lookup operation is performed. In the case of a hit, the requested data are removed from the cache in which the hit occurred (making the cache exclusive), and the data are injected into the return path of the network towards processor 60. Otherwise, if a miss occurs, the request is forwarded to the next-level cache farther from processor 60. Since backing store 65 contains values for all addresses, all requests are guaranteed to be served at some point in the linear array. When the data arrive on a return path to L1 cache 62, the data are stored, completing the move-to-front operation. In case of a conflict in L1 cache 62 (i.e., L1 cache 62 is full), the data currently stored in L1 cache 62 are pushed back by sending a store request to the next-level cache farther from processor 60. Store requests are handled by caches 62-64 in a manner similar to push-back signals within the spiral network of the above-described spiral cache.

Implementation of a move-to-front replacement heuristic on a buffered network suffers from two complications. First, even if generous buffering resources are included, a flow-control mechanism must be included to avoid overflows. The latency of a flow-controlled network is generally always higher than that of a systolic network. Second, the logic for conflict resolution on the return path and the inspection of the buffers needed to prevent undetected counterflow of requests and returned data is significantly more complex than the logic that implements flow control in a spiral cache design. The linear network depicted in FIG. 7B can be extended into higher-dimensional networks, such as 2-dimensional or 3-dimensional grids, in order to support 2-dimensional and 3-dimensional designs. However, non-uniform cache sizes complicate the design of such a "space filling" memory and theoretical performance guarantees for such an architecture may be difficult to develop.

Power Management The spiral cache described above provides a large cache memory that has low access latency. Large caches can cope with large working sets, e.g., sets of instructions and/or data associated with a given software process, but large caches waste power when executing for programs having small working sets, as the working sets only occupy a small portion of the cache. The structure of the spiral cache greatly facilitates dynamically adjusting the size of an active cache area to adapt to differing working set sizes. A spiral network imposes a linear structure on arbitrary-dimensional cache designs. The linear structure identifies the head (frontmost tile) and the tail for the move-to-front placement algorithm. As illustrated above, a move-to-front heuristic has the effect of compacting the working set of a program, or of multiple programs in a multiprogrammed environment, at the head of the spiral. The compaction effect is particularly visible for programs whose working set is smaller than the capacity of the spiral cache. Then, the spiral cache can be divided into two portions, an active portion at the head of the spiral which contains the working set, and an inactive portion at the tail of the spiral in which the storage of the tiles remains unused. The compaction of a spiral cache can be used, as mentioned above with reference to the linear array of FIG. 2, to reduce the power consumption of a spiral cache. In particular, in very large spiral caches, power consumption can be reduced for processes/programs having small working sets.

Figure 8A:
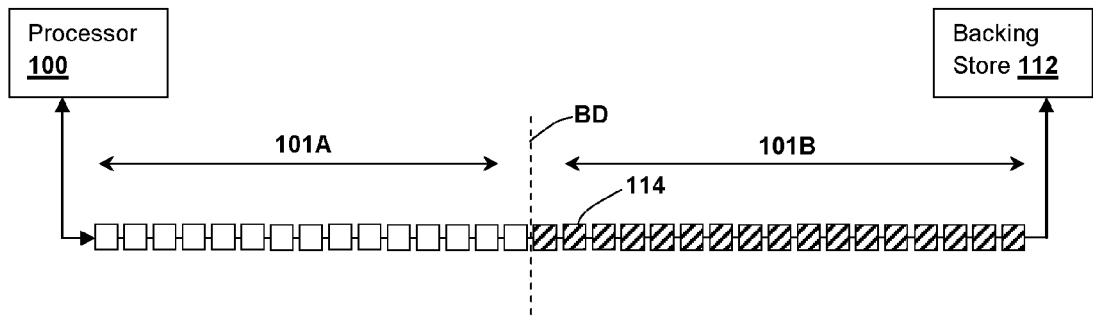
FIGS. 8A and 8B are block diagrams illustrating power management techniques in a spiral cache in accordance with embodiments of the present invention.

Referring now to FIG. 8A, a power management scheme for use in a spiral cache is illustrated, in accordance with an embodiment of the present invention. An active portion 101A of the spiral cache, which is illustrated as a linear array for simplicity, is divided from an inactive portion 101B, by a boundary BD, which can be set on a per-tile basis. Active portion 101A, is the portion closest to processor 100, and the inactive portion 101B is the portion closest to backing store 112. The memory arrays of tiles 114 within inactive portion 101B are placed in a power-down state. In the depicted embodiment, no global control of the position of boundary BD, nor the power-saving/power-down state of active portion 101A and inactive portion 101B is required. Tiles 114 can determine when to enter a power saving state based on activity observed at the tiles themselves, and therefore no external logic or control algorithm is needed. An exemplary algorithm for tile-determined power management will be described in further detail below with reference to FIG. 9. When boundary BD is moved toward processor 100, any values stored in tiles 114 which are entering an inactive state must be ejected to backing store 112 (which may be a next level of cache farther from processor 100)

Figure 8B:
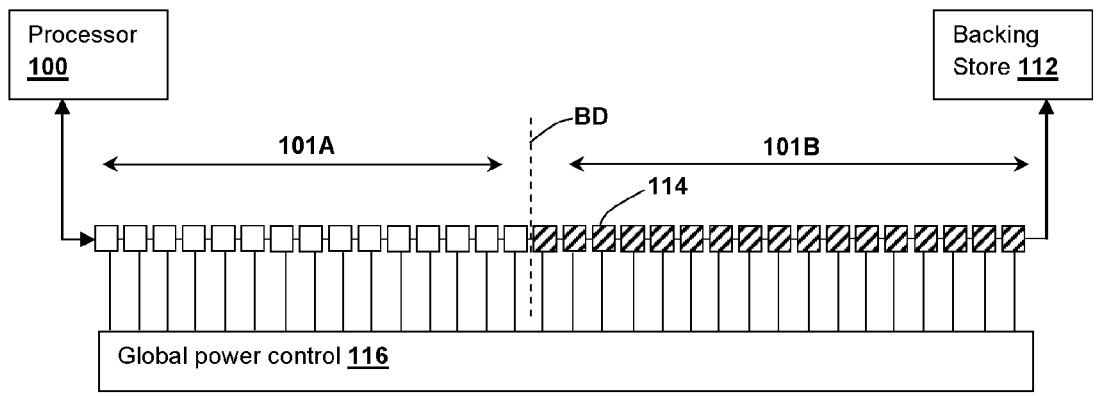

Referring now to FIG. 8B, a power management scheme for use in a spiral cache is depicted in accordance with an alternative embodiment of the present invention. FIG. 8B is similar to FIG. 8A, and therefore only differences between them will be described below. In FIG. 8B, the position of boundary BD is set by a global power control logic 116, which may select the size of active portion 101A in conformity with a priori information or measurements that indicate a size of a current working set, thereby dictating the desired "size" of the spiral cache. In both the embodiments of FIG. 8A and FIG. 8B, multiple power saving levels can be supported, in which the spiral cache is divided into more than two portions, which has advantages when the access latency to activate a tile in a portion that is in an intermediate power saving mode (e.g., low power "sleep" modes) is less than the access latency to backing store 112. If multiple power saving modes are supported in the tiles, the boundaries between the portions can be adjusted on a per-tile basis in a manner similar to that illustrated above for power-down vs. power-up states.

Figure 9:
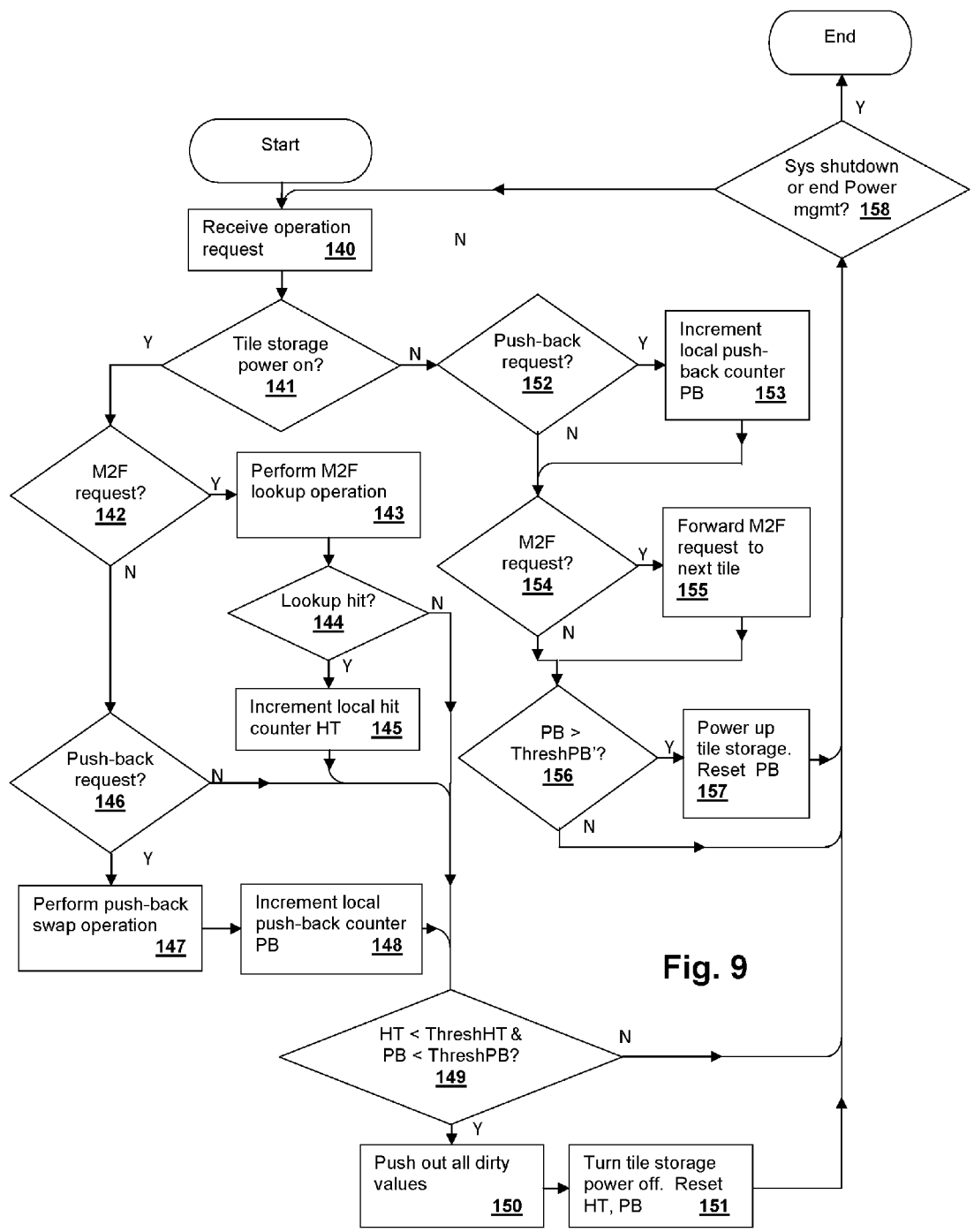
FIG. 9 is a flowchart illustrating a tile-managed power management technique in accordance with an embodiment of the present invention.
Figure 5:
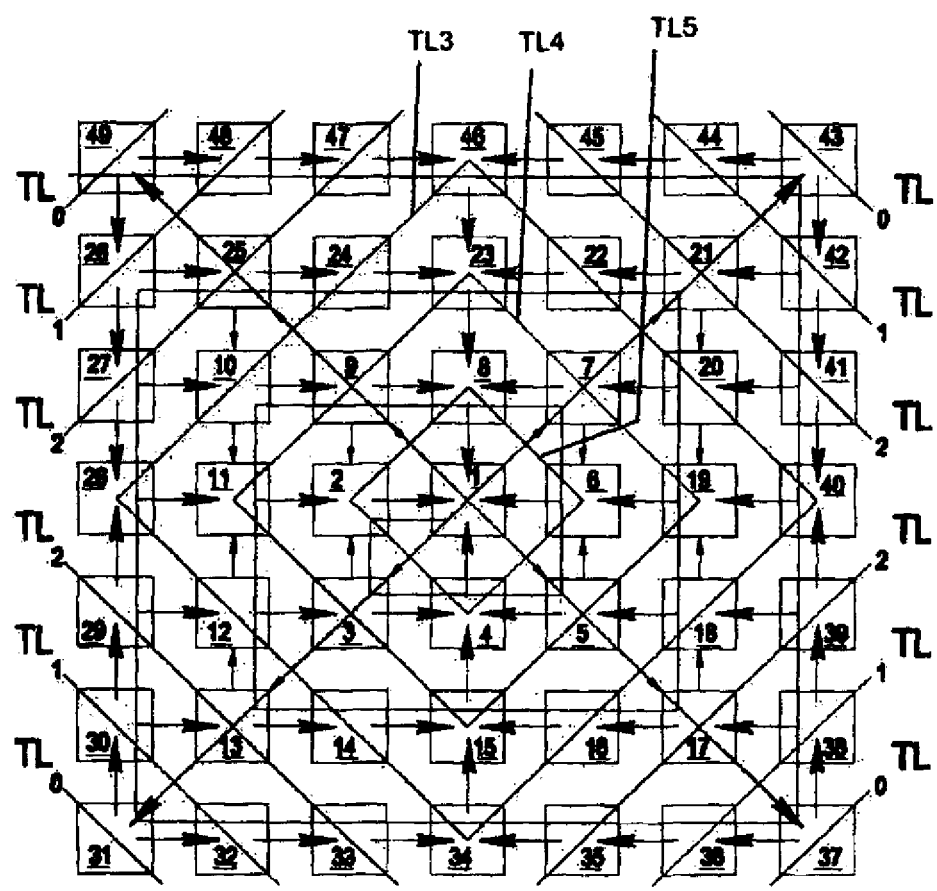

Referring now to FIG. 9, an algorithm for the power management of a tile in a spiral cache is illustrated in accordance with an embodiment of the present invention. The algorithm is executed within each tile and toggles the power supply of the tile's memory array between a powered state and an un-powered state. The move-to-front and push-back networks are maintained in an active state. Each tile maintains two counters: a hit counter HT and a push-back counter PB. During each duty cycle, each tile updates the counter implicated by push-back or move-to-front operations for the duty cycle. When an operation request is received (step 140), if the tile's storage is in the in-active (power down) state (decision 141), and if the operation is a push-back request (decision 152), then local push-back counter PB is incremented (step 153). If the request is a M2F request (decision 154) then the M2F request is forwarded to the next tiles (step 155). If the value of local push-back counter PB is greater than a first threshold ThreshPB' (decision 156), the tile's storage is powered on, and counter PB is reset (step 157). If the tile's storage is in the active (power up) state (decision 141), and the request is an M2F lookup request (decision 142) the M2F lookup operation is performed (step 143) and if the lookup hits (decision 144), local hit counter HT is incremented (step 145). If the tile's storage is in the active (power up) state (decision 141), and the request is a push-back request (decision 146), the push-back operation is performed (step 147) and local push-back hit counter PB is incremented (step 148). If the tile's storage is in the active (power up) state (decision 141), and if hit counter HT remains below hit threshold ThreshHT while push-back counter PB remains below a second lower push-back threshold ThreshPB (decision 149), all dirty values in the tile's storage are pushed out (step 150) and the storage array in the tile is turned off (step 151). Until the power management operations are suspended or the system is shut down (decision 158), the algorithm of steps 140-157 is repeated at each duty cycle. The effect of the operations above are such that when the array is powered on, the tile counts the number of hits due to move-to-front lookups and the number of lines received from the spiral network. If the rate of hits and push-ins (over a period of time) is less than a given threshold, the tile does not contribute constructively to the program execution. Thus, the tile should be removed from the active portion 101A of FIG. 8A. Before doing so, all "dirty" data (i.e., data that has been modified from the corresponding value contained in backing store 112) must be evicted. The eviction can be performed by pushing dirty data out towards the tail end of the spiral during duty cycles when the tile does not receive a push-in from the spiral network. When the array does not contain any more dirty data, the memory array can be powered off safely. A tile with a powered-down memory array monitors the push-back activity on the spiral by means of the push-back counter. If the number of push-backs over a period of time exceeds a given threshold, the tile could contribute its memory array constructively to the program execution. In this case, the tile powers up its memory array, and resumes storing push-in data and performing lookups due to requests arriving on the move-to-front network.

Design Considerations and features of the Spiral Cache In conclusion, there are several features of the spiral cache in accordance with an embodiment of the present invention as described above that provide flexibility to the designer and other advantages as noted below:

1. The spiral cache is a tiled architecture. Unlike traditional hierarchical memory designs, it is relatively easy to replicate the tiles to implement a spiral cache of desired size or capacity.
2. The size of the memory array within a tile can be varied at the designer's discretion to balance access latency, throughput, and power consumption. The smaller the array, the lower its access time, and the faster the entire spiral cache becomes. Furthermore, when a spiral cache of given capacity is based on smaller arrays, the number of tiles increases, which increases the pipeline depth and leads to higher throughput. However, a larger number of smaller tiles increases the worst-case access latency. As the worst-case access latency approaches the latency of the backing store, the performance gain of the spiral cache diminishes as it will with any other cache architecture. If wire efficiency is of primary concern, the array size should generally be chosen purely based on technological constraints such that the propagation delay across a tile equals the access latency of the array within a tile.
3. The move-to-front heuristic serves as a 2-competitive (re-)placement strategy of cache lines into tiles. No other cache architecture offers such a theoretical performance guarantee.
4. The move-to-front heuristic compacts the working set at the head of the spiral network. This self-organizing property implies small average access latency and low power consumption. As an aside, it is noted that so-called "cache oblivious algorithms" are honored by the spiral cache architecture. The benefit is not necessarily a performance gain compared to traditional hierarchies, because cache oblivious algorithms perform well on traditional caches, as well. It has been observed through simulation that applications performing particularly poorly on systems employing traditional memory hierarchies exhibit more substantial performance gains on the spiral cache. However, cache oblivious algorithms exhibit remarkably effective move-to-front compaction, which minimizes average access latency.
5. The systolic architecture of the spiral cache avoids the worst-case access latencies for each access incurred in earlier systolic designs by employing the move-to-front placement strategy and the search scheme with geometric retry. Furthermore, the spiral cache avoids the implementation overhead of buffering and flow control mechanisms required by ordinary pipelined hierarchical memory architectures. Instead, the move-to-front heuristic enables average access latencies to approach the best-case access latency which occurs when accessing the front-most tile only.
6. The tiled architecture is inherently pipelined. This pipelining capability facilitates a high-throughput memory with multiple accesses supported in-flight. Various processor architectures are capable of exploiting this property including superscalar processors, multithreaded processors, or parallel (multicore) architectures. Sharing a spiral cache among multiple threads or processors by interleaving their accesses has the potential to provide a inherently consistent memory architecture.
7. The need for interleaving push-back swap operations with move-to-front lookups in the array of each tile leads to a micro-pipelined design with a duty cycle of two or three clock cycles, depending on whether the array supports a single-cycle swap operation. If the latency due to the micro-pipeline is of concern, the latency can be avoided by doubling or tripling the clock frequency of the cache relative to the processor, or the latency can be masked by means of an additional L1-cache positioned between the processor and the spiral cache.
8. The spiral cache is capable of exploiting the dimensionality of Euclidean space. More succinctly, a k-dimensional spiral cache with N tiles has a worst-case access latency of $\theta(k\sqrt[k]{N})$.
9. A N-tile spiral cache behaves like an N-way set-associative cache. This statement assumes that each tile consists of a direct-mapped cache. The move-to-front heuristic together with the push-back functionality of the spiral network effectively implement an LRU stack for each (address) index. Using direct-mapped caches does not incur the cost of explicit LRU bookkeeping found in traditional set-associative caches. If the memory arrays within each tile were organized as n-way set-associative caches, however, then the spiral cache would provide the equivalent associativity of an (nN)-way set-associative cache.
10. The linear structure of the spiral network together with the compaction effect of the move-to-front heuristic facilitate decentralized power management. Tiles in the active subset at the head of the spiral contribute their arrays to the capacity of the cache, while inactive tiles beyond the working set can safely power down their memory array. Such an adaptive power management is not practical in hierarchical memory organizations that maintain the inclusion property.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A storage circuit for storing multiple values within a memory hierarchy, wherein the storage circuit comprises:
   multiple storage tiles having at least one storage element for storing the multiple values;
   an input interface coupled to a front-most one of the multiple storage tiles for receiving requests for requested ones of the multiple values;
   a first output interface coupled to the front-most storage tile for providing the requested values from the front-most tile in response to the requests, wherein multiple requests are issued to the input interface without requiring that a previously requested value be provided at the output interface in response to a previous request prior to receiving a subsequent request for another value at the input interface; and
   a second output interface for connection to a higher-order level of the memory hierarchy for ejecting one of the multiple values other than a value stored in the front-most tile to the higher-order level of the memory hierarchy, in response to one of the at least one storage element of the front-most tile being emptied for storing the particular requested value.

2. The storage circuit of claim 1, wherein the input interface and the first output interface are provided by the same connection.

3. The storage circuit of claim 1, wherein the second output interface only ejects the one of the multiple values to the higher-order level of the memory hierarchy if the multiple storage tiles are all occupied by the values, and wherein the storage circuit receives an additional value from the memory hierarchy without ejecting the one of the multiple values if the multiple storage tiles are not all occupied.

4. The storage circuit of claim 1, wherein the second output interface comprises:
   a queue for buffering ejected ones of the multiple values; and
   a flow control logic for preventing the ejected values from overflowing an input to the higher-order level of the memory hierarchy.

5. The storage circuit of claim 1, wherein the multiple storage tiles form a linear array with respect to the second output interface, and wherein the second output interface ejects the one of the multiple values from a dynamically selectable tile position, whereby an active size of the storage circuit is dynamically adjusted according to the selection of the dynamically selectable tile position.

6. The storage circuit of claim 5, further comprising power management control logic that removes power from the at least one storage element within a set of inactive tiles extending from a tile adjacent to the dynamically selectable tile position and farther from the front-most tile, whereby an inactive portion of the storage circuit is deactivated to reduce power consumption in the storage circuit.

7. The storage circuit of claim 6, wherein the power management control logic is implemented within the multiple storage tiles, and wherein the selection of the dynamically selectable tile position occurs due to selection of a power-down state within each tile.

8. The storage circuit of claim 1, wherein the multiple storage tiles comprise cache memories.

9. A method of caching a plurality of values within a storage device, comprising:
- storing the plurality of values in multiple storage tiles;
- receiving requests for requested ones of the values at an input interface;
- providing the requested values from a front-most one of the multiple storage tiles, in response to the requests, through a first output interface coupled to the front-most one of the storage tiles, wherein multiple requests are issued to the input interface without requiring that a previously requested value be provided at the first output interface in response to a previous request prior to receiving a subsequent request for another value at the input interface; and
- ejecting one of the multiple values other than a value stored in the front-most tile to the higher-order level of the memory hierarchy from a second output interface, in response to a storage location in the front-most tile being emptied for storing the particular requested value.

10. The method of claim 9, wherein the ejecting is performed only if the multiple storage tiles are all occupied by the values, and further comprising receiving an additional value from the memory hierarchy without ejecting the one of the multiple values if the multiple storage tiles are not all occupied.

11. The method of claim 9, further comprising:
- buffering ejected ones of the multiple values in a queue; and
- preventing the ejected values from overflowing an input to the higher-order level of the memory hierarchy according to the operation of a flow control logic.

12. The method of claim 9, wherein the ejecting ejects the one of the multiple values from a dynamically selectable tile position, whereby an active size of the storage circuit is dynamically adjusted according to the selection of the dynamically selectable tile position, and wherein the method further comprises selecting the dynamically selectable tile position to set the active size of the storage circuit.

13. The method of claim 12, further comprising removing power from the at least one storage element within a set of inactive tiles extending from a tile adjacent to the dynamically selectable tile position and farther from the front-most tile, whereby an inactive portion of the storage circuit is deactivated to reduce power consumption in the storage circuit.

14. The method of claim 12, wherein the removing comprises:
- determining, individually within the multiple storage tiles, whether or not to enter a power down state; and
- wherein the multiple storage tiles enter a power down state responsive to determining that the power down state should be entered.

15. A processing system, comprising:
- a processor for executing program instructions and operating on data values; and
- a cache memory for caching multiple values including at least one of the program instructions or the data values, the cache memory comprising multiple storage tiles having at least one storage location for storing the values, an input interface for receiving requests for requested ones of the multiple values from the processor, a first output interface coupled to a front-most one of the multiple storage tiles for providing the requested values from the front-most tile to the processor in response to the requests, wherein multiple requests are issued to the input interface without requiring that a previously requested value be provided at the first output interface in response to a previous request prior to receiving a subsequent request for another value at the input interface, and a second output interface for connection to a higher-order level of the memory hierarchy for ejecting one of the multiple values other than a value stored in the front-most tile to the higher-order level of the memory hierarchy, in response to the at least one storage location in the front-most tile being emptied for storing the particular requested value.

16. The processing system of claim 15, wherein the pushback interface only ejects the one of the multiple values to the higher-order level of the memory hierarchy if the multiple storage tiles are all occupied by the values, and wherein the cache memory receives an additional value from the higher-order level of the memory hierarchy without ejecting the one of the multiple values if the multiple storage tiles are not all occupied.

* * * * *

UNITED STATES PATENT AND TRADEMARK OFFICE
CERTIFICATE OF CORRECTION

PATENT NO. : 8,271,728 B2  Page 1 of 2
APPLICATION NO. : 12/270249
DATED : September 18, 2012
INVENTOR(S) : Strumpen It is certified that error appears in the above-identified patent and that said Letters Patent is hereby corrected as shown below:

In the Drawings

Sheet 7, Fig. 5, lines should connect reference designators TL4, TL3 and TL5 with the indicated features as shown on attached sheet.

Signed and Sealed this
Twenty-first Day of April, 2015

Michelle K. Lee
*Director of the United States Patent and Trademark Office*